(12) United States Patent
Jäckel et al.

(10) Patent No.: US 6,418,620 B1
(45) Date of Patent: Jul. 16, 2002

(54) METHOD OF MAKING BEARINGS FOR USE IN TORSIONAL VIBRATION DAMPERS

(75) Inventors: Johann Jäckel, Baden-Baden (DE); Daniel Niess, Strassburg (FR)

(73) Assignee: LuK Lamellen und Kupplungsbau, Buhl/Baden (DE)

( * ) Notice: Subject to any disclaimer, the term of this patent is extended or adjusted under 35 U.S.C. 154(b) by 0 days.

(21) Appl. No.: 09/634,337

(22) Filed: Aug. 8, 2000

Related U.S. Application Data

(62) Division of application No. 09/128,461, filed on Aug. 4, 1998, now Pat. No. 6,129,192.

(30) Foreign Application Priority Data

Aug. 4, 1997 (DE) .......................................... 197 33 723
Feb. 28, 1998 (DE) .......................................... 198 08 647

(51) Int. Cl.$^7$ ............................................. B21D 53/26
(52) U.S. Cl. ....................................... 29/894; 29/898.09
(58) Field of Search ............................. 29/894, 898.07, 29/898.09; 192/208; 464/64, 68

(56) References Cited

U.S. PATENT DOCUMENTS

| | | | | |
|---|---|---|---|---|
| 1,158,369 A | * | 10/1915 | Bunting | ................... 29/898.11 |
| 1,676,171 A | * | 7/1928 | Valentine | ................... 29/898.07 |
| 2,168,227 A | * | 8/1939 | Lignian | ................... 29/898.07 |
| 2,185,483 A | * | 1/1940 | Ward | ....................... 29/898.11 |
| 5,836,216 A | * | 11/1998 | Sudau et al. | ................... 464/68 |

* cited by examiner

Primary Examiner—P. W. Echols
(74) Attorney, Agent, or Firm—Darby & Darby

(57) ABSTRACT

The centering unit for the primary and secondary flywheels of a torsional vibration damping apparatus for use in the power train of a motor vehicle employs a radial bearing with a sleeve which is or can be a press fit on or in one of the flywheels, and the still accessible internal or external surface of the sleeve is calibrated simultaneously with or following the press fit. The calibrated surface of the sleeve is thereupon inserted into a socket or receives an extension of the other flywheel. The centering unit further utilizes an axial bearing wherein the function of the sleeve in the radial bearing is performed by an annular collar which can extend radially inwardly or radially outwardly of the sleeve. One of the bearings can be installed radially inwardly of the fasteners which secure the primary flywheel to the output shaft of the engine, and the other bearing can be installed radially outwardly of such fasteners.

40 Claims, 3 Drawing Sheets

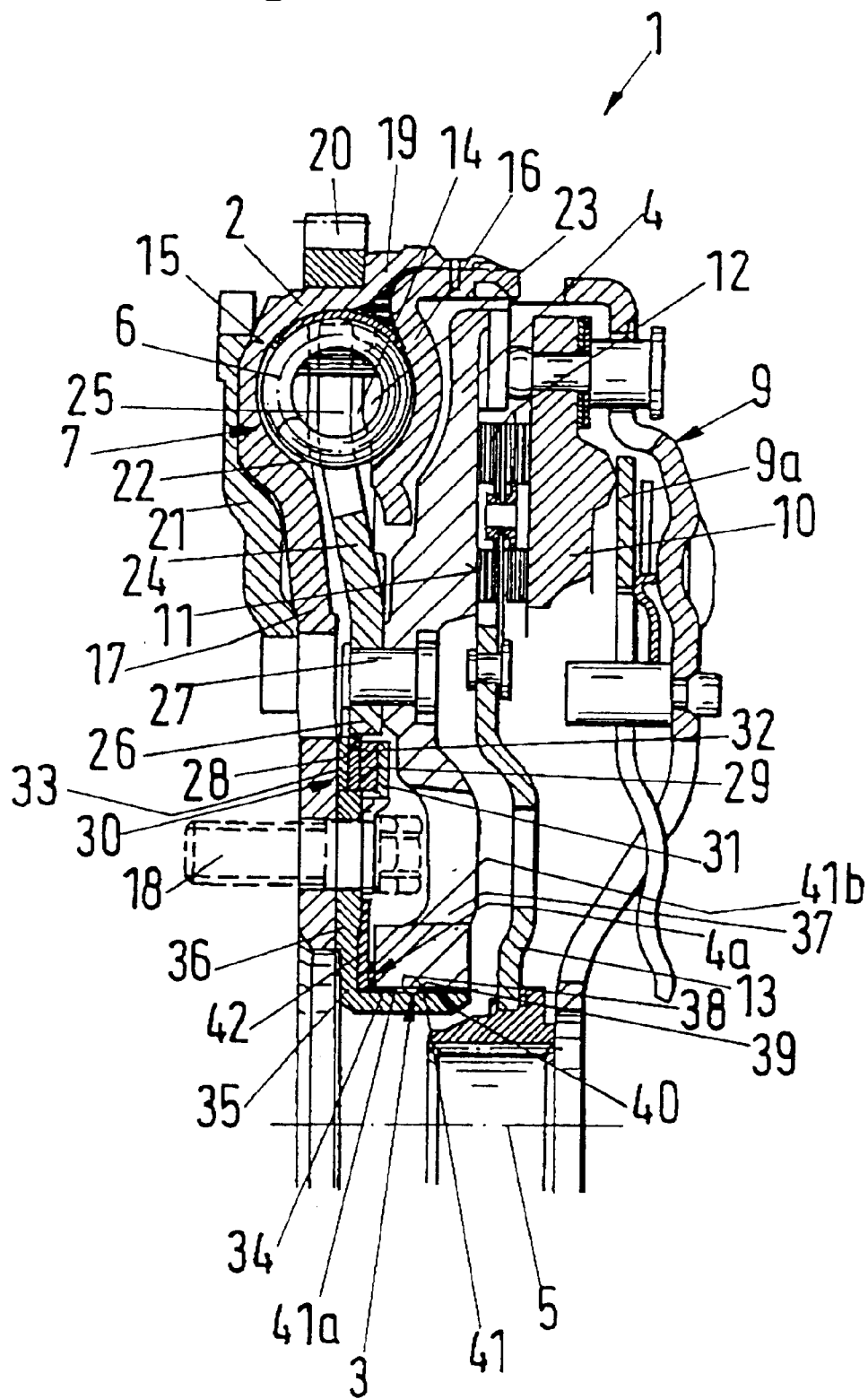

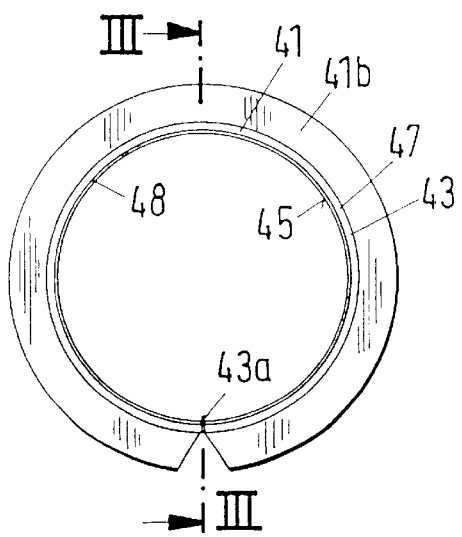
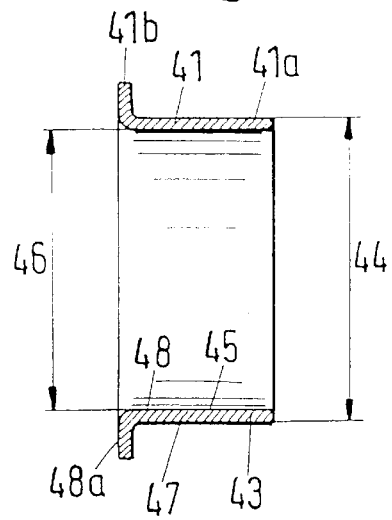
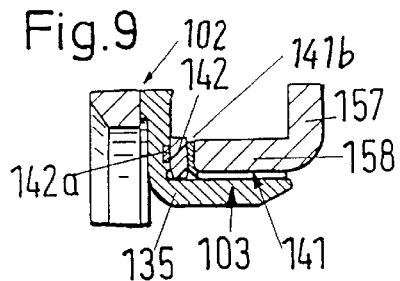
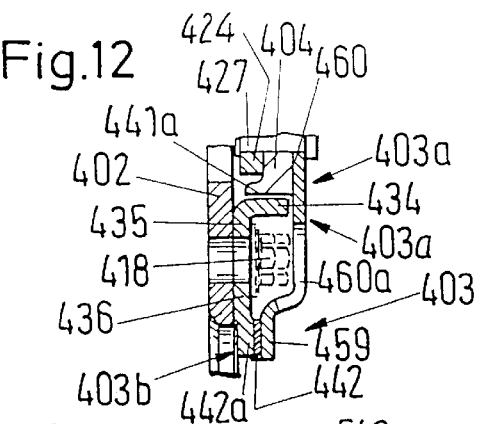
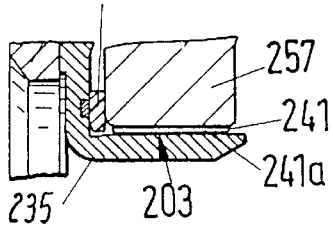
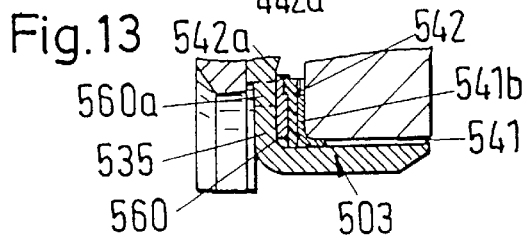
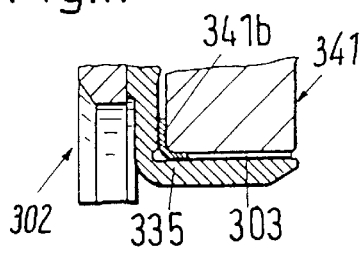
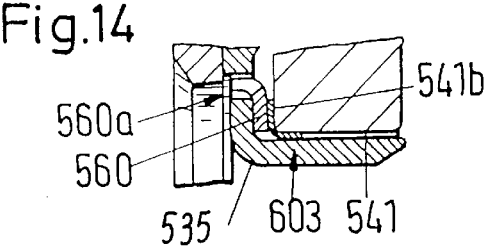

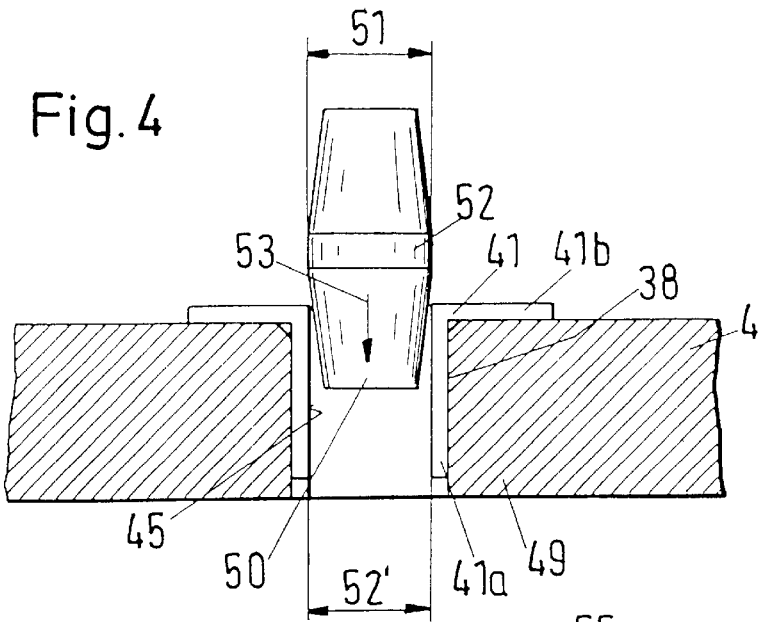
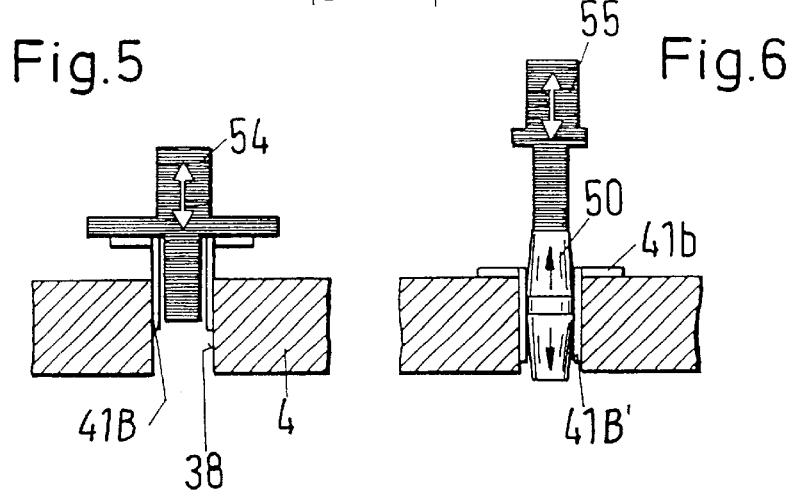
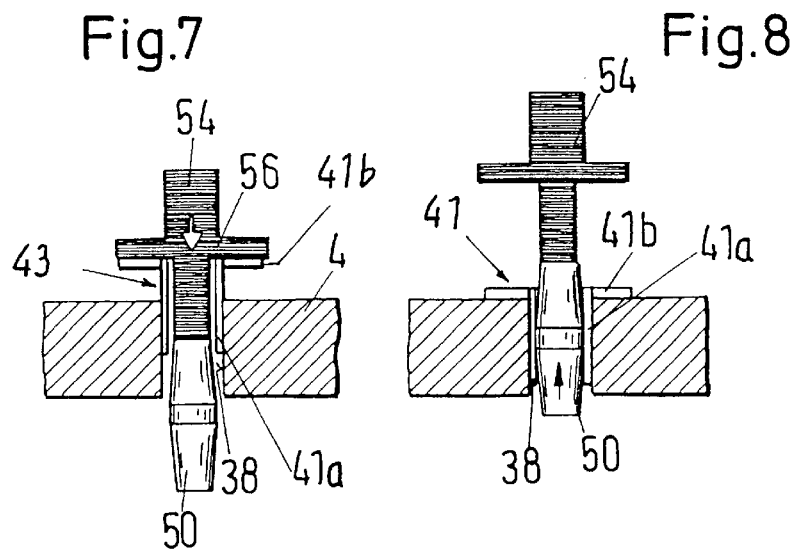

METHOD OF MAKING BEARINGS FOR USE IN TORSIONAL VIBRATION DAMPERS

This is a division of application Ser. No. 09/128,461, filed Aug. 4, 1998, now U.S. Pat. No. 6,129,192, which is hereby incorporated herein by reference in its entirety.

FIELD OF THE INVENTION

The invention relates to improvements in methods of making, assembling and operating an apparatus which can be utilized to damp vibrations in the power trains of motor vehicles, for example, between the crankshaft or camshaft of an internal combustion engine and the input shaft of a manually shiftable or automated transmission. The invention also relates to improvements in torsional vibration damping apparatus which can be utilized with advantage in the power trains of motor vehicles.

More particularly, the invention relates to improvements in methods of making torsional vibration damping apparatus of the type wherein input and output members are rotatable with and relative to each other about a common axis, wherein the angular movements of the input or output member relative to the other member are opposed by at least one damper, and wherein the input and output members are centered relative to each other by radial and/or axial (thrust) bearings.

Published German patent applications Serial Nos. 35 15 928 A1 and 34 11 092 A1 disclose torsional vibration damping apparatus wherein rotation of coaxial primary and secondary flywheels relative to each other is opposed by a damper employing energy storing devices in the form of coil springs. A journal bearing is provided to center and locate the flywheels relative to each other radially as well as in the direction of their common axis.

It has been found that such centering means which act as radial and simultaneously as axial bearings exhibit a number of drawbacks. One of the reasons is that the parts of the combined radial and axial bearing must be finished and assembled with minimal tolerances which contributes to the cost of the centering means and of the entire torsional vibration damping apparatus. In fact, the tolerances are frequently so narrow that they can be defined as so-called negative tolerances, i.e., the parts which are to rotate and/or move axially relative to each other can carry out the required movements only by overcoming a pronounced resistance to axial and/or angular movement relative to one anoter. In other words, the frictional resistance which is encountered by the primary and secondary flywheels of a torsional vibration damping apparatus embodying axial and/or radial bearings of the above outlined character operates in parallel with the aforementioned coil springs of the damper.

The combined resistance to rotation of the primary and secondary flywheels in such torsional vibration dampers is often excessive for satisfactory operation of the apparatus in the power trains of numerous types of motor vehicles, especially during certain stages of operation of the vehicles. For example, the combined resistance of the aforediscussed bearings and of the springs of a damper in a torsional vibration damping apparatus is often excessive when the engine is idling, i.e., when the transmission is in neutral gear. Thus, the engine continues to transmit vibratory movements to the input element of the transmission, and this often entails the generation of undesirable noise (such as rattling) in the transmission and/or in certain other constituents of the power train.

Another drawback of presently known and utilized torsional vibration damping apparatus which employ combined axial and radial bearings with parts which are to be assembled with minimal or even negative tolerances is that, due to unavoidable departures from ideal tolerances, the tolerances which actually develop during assembly of a conventional torsional vibration damping apparatus and/or during installation of such apparatus in a power train are highly unpredictable and can vary from apparatus to apparatus or from power train to power train. In other words, the likelihood of ensuring that the quality of the centering action of combined radial and axial bearings in a long (or even short) series of power trains will remain within a desired or prescribed range is rather remote.

On the other hand, attempts to avoid excessively narrow tolerances (or even negative tolerances) and the resulting pronounced friction between the component parts in the centering means (and/or between such component parts and the input and output members of a torsional vibration damping apparatus) by simply increasing the radial tolerances would invariably result in equally unsatisfactory excessive play between neighboring relatively movable parts right from the time of initial assembly of a torsional vibration damping apparatus and its incorporation into a power train. This could result in pronounced wobbling of parts (such as primary and secondary flywheels) in a new apparatus with attendant pronounced or excessive wear and generation of noise within a range (i.e., of an intensity) which is unacceptable to the occupant or occupants of a motor vehicle.

OBJECTS OF THE INVENTION

An object of the invention is to provide a novel and improved method of making and assembling torsional vibration damping apparatus with tolerances which are more predictable and hence more acceptable than those developing in heretofore known torsional vibration damping apparatus.

Another object of the invention is to provide a method which ensures that the noise generated by the parts of an apparatus which is assembled and installed in accordance with such method is much less bothersome than the noise generated by conventional torsional vibration damping apparatus.

A further object of the invention is to provide novel and improved centering means for use in a torsional vibration damping apparatus which is constructed, assembled and installed in accordance with the above outlined method.

An additional object of the invention is to provide a method which renders it possible to furnish highly satisfactory centering means for use in torsional vibration damping apparatus at a cost which is much less than the cost of conventional apparatus wherein the centering means are assembled with negligible or even negative tolerances.

Still another object of the invention is to provide a method which renders it possible to produce short or long series of centering means with highly satisfactory and highly predictable tolerances between parts which are called upon to rotate and/or to move axially relative to each other.

A further object of the invention is to provide a torsional vibration damping apparatus which is constructed and assembled in accordance with the above outlined method.

Another object of the invention is to provide a power train which embodies the above outlined torsional vibration damping apparatus, for example, between the output shaft of an internal combustion engine and the friction clutch which transmits torque to the input shaft of the transmission.

An additional object of the invention is to provide novel and improved procedures for the establishment of satisfactory tolerances between the primary and secondary flywheels of so-called dual-flywheel torsional vibration dampers between the engines and the clutches of power trains in motor vehicles.

Still another object of the invention is to provide a torsional vibration damping apparatus with novel and improved primary and secondary flywheels.

A further object of the invention is to provide a torsional vibration damping apparatus whose operation is exceptionally quiet and smooth even though the constituents of the bearings in such apparatus need not be machined and/or otherwise treated to an exceptionally high degree of precision finish.

An additional object of the invention is to provide a novel and improved sleeve for use in the radial bearing of the above outlined torsional vibration damping apparatus.

SUMMARY OF THE INVENTION

One feature of the invention resides in the provision of a method of making an apparatus which is to be utilized as a means for damping torsional vibrations and comprises at least one input member, at least one output member which is rotatable with an relative to the output member about a common axis, and a centering means or unit or system including a bearing which is interposed between the input and output members to center such members at least against excessive movements relative to each other radially of the common axis and comprises a sleeve having external and internal surfaces. The improved method comprises the steps of establishing an at least substantially clearance free fit between one surface of the sleeve and a complementary surface of one of the input and output members, calibrating the diameter of the other surface of the sleeve, and thereafter juxtaposing the other surface of the sleeve with a complementary surface of the other of the input and output members.

One of the complementary surfaces can constitute an external surface of an extension of the respective one of the input and output members.

As a rule, one of the complementary surfaces overlies the other complementary surface as seen in the direction of the common axis of the input and output members.

The one surface can constitute the external surface of the sleeve, and the calibrating step then preferably includes introducing a male calibrating tool into the sleeve.

If the one surface is the internal surface of the sleeve, the calibrating step can include introducing the sleeve into a female calibrating tool.

The calibrating step can include hardening and/or densifying the sleeve in the region of the other surface.

In addition to or in lieu of hardening and/or densifying, the calibrating step can include imparting to the other surface of the sleeve a roughness in the range of between Rz 1.6 and 6 micrometers, particularly between Rz 3 and 5 micrometers.

It is also within the purview of the invention to impart to the other surface of the sleeve a roughness of less than 0.8 micrometer, particularly in the range of between 0.3 and 0.6 micrometer.

Still further, the calibrating step can include reducing the out-of-roundness of the internal surface of the sleeve provided, of course, that the internal surface was out of round, or excessively out of round, prior to the calibrating step.

The calibrating step can also comprise (or it can be preceded by) the step of lubricating the other surface of the sleeve. Such lubricating step can include contacting the other surface of the sleeve with oil. Alternatively, or in addition to the just discussed lubrication, the calibrating step can include lubricating a calibrating surface of a calibrating tool, and contacting one surface (particularly the outer surface) of the sleeve with the calibrating surface of such tool.

If the other surface is the internal surface of the sleeve, the calibrating step can include inserting into the sleeve a male calibrating tool having a maximum outer diameter which exceeds the desired or expected or optimum diameter of the internal surface of the sleeve by a value in the range of between 0.03 and 0.15 millimeter, particularly between 0.06 and 0.12 millimeter. Such calibrating step preferably results in an increase of the diameter of the internal surface of the calibrated sleeve by between 5 and 40% of the difference between the maximum outer diameer of the male calibrating tool and the diameter of the internal surface of the sleeve prior to the calibrating step. A presently preferred increase of the diameter of the internal surface of the sleeve is between 10 and 25%.

If the other surface is the internal surface of the sleeve, the calibrating step can include inserting into the sleeve a male calibrating tool in the direction of the common axis of the input and output members (such axis coincides or should coincide with the axis of the sleeve), and thereupon extracting the male calibrating tool from the sleeve in the direction of such axis. The arrangement can be such that initial insertion of the male calibrating tool takes place in a first direction, and the extracton of the tool (this actually amounts to a renewed calibration) takes place in a second direction counter to the first direction.

If the other surface is the external surface of the sleeve, the calibrating step can include slipping onto the external surface of the sleeve a female calibrating tool in the axial direction of the sleeve, and thereupon retracting the female calibrating tool off the external surface of the sleeve in the axial direction of the sleeve.

At least a part of the calibrating step can take place simultaneously with the first step (of establishing the at least substantially clearance-free fit). The step of establishing an at least substantially clearance-free fit can include utilizing a first part of a combined fitting and calibrating tool, and the calibrating step then comprises (or can comprise) utilizing a second part of the combined fitting and calibrating tool. If the one surface is the external surface of the sleeve, the step of utilizing the second part of the combined fitting and calibrating tool can include causing the second part to enter the sleeve axially in a first direction prior to the step of establishing an at least substantially clearance-free fit so that a calibrating portion of the second part of the combined fitting and calibrating tool is confined in a portion of the internal surface of the sleeve which is to be calibrated, and extracting the second part of the combined fitting and calibrating tool from the sleeve in a second direction counter to the first direction and subsequent to the step of establishing the at least substantially clearance-free fit.

If the apparatus is of the type wherein the sleeve of the centering means has a slot extending all the way between its ends (such as an axially parallel slot or a helical slot) and being bounded by axially parallel or helical faces, the step of establishing the at least substantially clearance-free fit can comprise inserting the external surface of the slotted sleeve into the complementary internal surface of the respective one of the input and otput members to thus urge the axially parallel or helical faces which bound the slot against each other and to simultaneously urge the external surface of the sleeve against the complementary internal surface of the respective (input or output) member.

If the sleeve is provided with an external collar at one of its axial ends, the method can further comprise the step of locating the collar between confronting radial surfaces of the input and output members to thus determine (i.e., fix) the axial positions of the input and output members relative to each other. Such method can further comprise the step of making the collar of one piece with the one end of the sleeve, and/or the step of imparting to the collar an at least substantially circular outline.

The method can also comprise the step of imparting to the sleeve the shape of a cylinder.

Still further, the method can comprise the step of coating at least one of the internal and external surfaces of the sleeve with a friction reducing material.

The step of establishing the at least substantially clearance-free fit can comprise providing one of the input and output members with an axial extension close to the common axis of the input and output members, and inserting one of the extension and the sleeve into the other of these parts. The inserting step can comprise establishing a press fit between the extension and the sleeve. Alternatively, the inserting step can include establishing between the extension and the sleeve a sliding fit which permits the extension and the sleeve to turn relative to each other about the common axis of the input and output members in the fully assembled apparatus. The aforementioned providing step can include deforming a portion of the respective (input or output) member to thus provide the extension on the deformed member. The deforming step can constitute a deep drawing step.

The method can further comprise the steps of providing one of the input and output members with a socket and providing the other of these members with an extension. In accordance with this method, the step of establishing the at least substantially clearance-free fit can include a first inserting step of introducing the sleeve or the extension into the other of these parts, and the method can further comprise a second inserting step which involves introducing the other of the parts including the sleeve and the extension into the socket upon completion of the calibrating step. The first inserting step can include establishing a tight fit between the extension and the sleeve, and the second inserting step can include establishing a tight fit between a surface surrounding the socket and the other of the parts including the sleeve and the extension.

If the method involves the making of an apparatus wherein the input and output members respectively comprise primary and secondary flywheels, such method can further comprise the steps of connecting the primary flywheel to a rotary output component of a prime mover in a power train of a motor vehicle (e.g., to the camshaft or to the crankshaft of the internal combustion engine in the power train), connecting the secondary flywheel with a rotary input component of a transmission in the power train, and providing the power train with a damper which opposes rotation of the flywheels relative to each other. Such method can further comprise the step of utilizing the sleeve as a part of a combined radial and axial or thrust bearing for the flywheels. The step of connecting the secondary flywheel with the rotary input component of the transmission can include providing the power train with an engageable and disengageable clutch (such as a friction clutch) arranged to receive torque from the secondary flywheel and to rotate the input component when it assumes an at least partially engaged condition.

Another feature of the invention resides in the provision of an apparatus for damping torsional vibrations, e.g., in the power train of a motor vehicle. The improved apparatus comprises an input member and an output member which is rotatable with and relative to the input member about a common axis. The input and output members have annular surfaces which overlie each other as seen in the direction of the common axis, and the apparatus further comprises resilient means for yieldably opposing rotation of the input and output members relative to each other, and means for centering the input and output members relative to each other. The centering means comprises a radial bearing having a sleeve with an internal surface complementary to and adjacent to one of the annular surfaces, and an external surface complementary and adjacent to the other of the two annular surfaces. The centering means further comprises an axial or thrust bearing which is interposed between the input and output members. The sleeve is located at a first radial distance from the common axis, and the thrust bearing is located at a different second radial distance from such axis.

The second radial distance can be less than the first radial distance. The input and output members of such apparatus can respectively comprise primary and secondary flywheels, and the apparatus can further comprise means for connecting the primary flywheel with a rotary output component of a prime mover in a power train of a motor vehicle. The secondary flywheel of such apparatus is connectable with a rotary input component of a transmission in the power train, and such secondary flywheel can be provided with at least one opening affording access to the connecting means. The at least one opening can be located at a third radial distance from the common axis; the third radial distance can be greater than the second radial distance but less than the first radial distance.

The thrust bearing can comprise at least one annular member which extends radially of the common axis and has a surface slidably contacting (directly or indirectly) one of the input and output members.

At least one of the annular and complementary surfaces can be provided with a smooth finish; for example, the at least one surface can be burnished or it can be treated in a lathe or another turning machine.

It is further possible to provide at least one layer of a suitable friction reducing material on at least one of the annular and complementary surfaces; for example, such at least one layer can contain a sintered friction reducing material which can be rolled onto the at least one surface. The at least one layer of friction reducing material can contain porous bronze, and such layer can further contain a lubricant.

The sleeve of the radial bearing can consist of a metallic sheet material, e.g., of sheet aluminum or sheet steel stock.

The thrust bearing can comprise a collar located in a plane which is at least substantially normal to the common axis of the input and output members received between neighboring radial surfaces of such members. This thrust bearing preferably further comprises at least one layer of friction reducing material which is provided on or at least the collar adjacent at least one of the two radial surfaces.

The sleeve of the radial bearing can constitute a converted blank of sheet material.

Furthermore, at least a portion of at least one of the input and output members can be made of a suitable sheet material.

As already mentioned above, the input and output members can respectively comprise primary and secondary flywheels, and the apparatus can further comprise an engageable and disengageable clutch which is arranged to receive torque from the primary flywheel (preferably by way of the secondary flywheel). The clutch normally comprises a clutch spring, and the apparatus can further comprise means for biasing the thrust bearing in the direction of the common axis of the input and output members (i.e., of the primary and secondary flywheels). Such apparatus further comprises means for disengaging the clutch, and such disengaging means can comprise a bearing device (e.g., an antifriction ball or roller bearing) arranged to disengage the clutch by way of the clutch spring. Such bearing device can constitute the aforementioned means for biasing the thrust bearing. The clutch spring can include or constitute a diaphragm spring.

The novel features which are considered as characteristic of the invention are set forth in particular in the appended claims. The improved torsional vibration damping apparatus itself, however, both as to its construction and the mode of making, assembling and utilizing the same, together with numerous additional important and advantageous features and attributes thereof, will be best understood upon perusal of the following detailed description of certain presently preferred specific embodiments with reference to the accompanying drawings.

BRIEF DESCRIPTION OF THE DRAWINGS

FIG. 1 is a fragmentary axial sectional view of an apparatus for damping torsional vibrations wherein the system for centering the rotary input and output members for rotation about a common axis is constructed and assembled in accordance with a method which embodies one form of the invention;

FIG. 2 is an end elevational view of a bearing sleeve which can be utilized in the apparatus of FIG. 1 upon a treatment in accordance with the improved method;

FIG. 3 is an axial sectional view of the bearing sleeve substantially as seen in the direction of arrows from the line III—III in FIG. 2;

FIG. 4 illustrates one mode of calibrating the internal surface of the cylindrical portion of the bearing sleeve;

FIG. 5 illustrates the step of fitting the cylindrical portion of a bearing sleeve into the socket of a flywheel which can be utilized in the improved apparatus;

FIG. 6 illustrates a next following step which involves a calibration of the internal surface of the cylindrical portion of a bearing sleeve following the fitting step of FIG. 5;

FIG. 7 illustrates a fitting step which constitutes a modification of the step shown in FIG. 5;

FIG. 8 illustrates a calibrating step which follows the fitting step of FIG. 7;

FIG. 9 is a fragmentary axial sectional view of a centering system constituting a modification of the centering system which is utilized in the apparatus of FIG. 1;

FIG. 10 is a similar fragmentary axial sectional view showing a further centering system;

FIG. 11 is a similar fragmentary axial sectional view of a centering system constituting a further modification of the system which is utilized in the apparatus of FIG. 1;

FIG. 12 is a fragmentary axial sectional view of a centering system which utilizes a two-piece bearing sleeve;

FIG. 13 is a fragmentary axial sectional view of still another centering system; and FIG. 14 is a similar fragmentary axial sectional view of a centering system which constitutes a modification of a system including the parts shown in FIG. 13.

DESCRIPTION OF PREFERRED EMBODIMENTS

FIG. 1 shows a portion of a torsional vibration damping apparatus 1 which is a so-called dual mass flywheel having an input member constituted by or including a primary flywheel 2 and an output member including or constituted by a secondary flywheel 4. The flywheels 2, 4 are rotatable with and relative to each other about a common axis 5. Rotation of the primary flywheel 2 relative to the secondary flywheel 4 and/or vice versa takes place against the opposition of a damper 7 including a set of elongated straight or arcuate energy storing devices in the form of coil springs 6.

The primary flywheel 2 can be affixed to the output component (e.g., a camshaft or a crankshaft) of a prime mover (such as the internal combustion engine in the power train of a motor vehicle) by a set of axially parallel threaded fasteners 18. The secondary flywheel 4 carries a friction clutch 9 which, in turn, includes or cooperates with a clutch disc or clutch plate 13 having a hub connectable to the input component (such as a shaft, not shown) of a manually shiftable or automated transmission. Reference may be had, for example, to commonly owned U.S. Pat. No. 5,160,007 granted Nov. 3, 1992 to Wolfgang Reik et al. for "APPARATUS FOR TRANSMITTING TORQUE TO THE POWER TRAINS OF MOTOR VEHICLES" which shows a dual mass flywheel between the engine and the transmission in the power train of a motor vehicle.

The friction linings 12 of the clutch disc 13 are located between an annular friction surface 11 of the secondary flywheel 4 and an axially movable pressure plate 10 of the friction clutch 9. When the clutch 9 is engaged, the pressure plate 10 bears upon the adjacent set of friction linings 12 so that the other set of friction linings is urged against the friction surface 11 whereby the secondary flywheel 4 can transmit torque to the transmission by way of the clutch disc 13. The magnitude of transmitted torque depends upon the extent of slip between the left-hand set of friction linings 12 and the friction surface The coil springs 6 of the damper 7 are installed in an annular chamber 14 which is defined by the primary flywheel 2 and is or can be at least partially filled with oil or another suitable lubricant. It is presently preferred to provide the damper 7 with a relatively small number of elongated coil springs 6 which permit extensive angular movements of the flywheels 2 and 4 relative to each other. The chamber 14 is defined by two suitably profiled sheet metal parts 15, 16 of the primary flywheel 2. The part 15 includes a substantially radially extending wall 17 having a radially inner portion which can be secured to the rotary output component of the prime mover by the aforementioned fasteners 18. The radially outermost portion 19 of the part 15 is an annulus which surrounds the coil springs 6 in the chamber 14 and carries a starter gear 20. The portion 19 is sealingly secured to the adjacent portion of the part 16 (e.g., by welding).

Portions of the coil springs 6 extend radially outwardly beyond the friction surface 11 of the secondary flywheel 4. It is also possible to select the dimensions and/or the locus of the annular chamber 14 in such a way that each of the coil springs 6 is located, in its entirety, radially outwardly of the friction surface 11.

The primary flywheel 2 carries an annular auxiliary mass 21 which is adjacent and is affixed to the exposed side of the wall 17 (e.g., by welding). This auxiliary mass is also made of a suitable metallic sheet material.

The parts 15, 16 respectively comprise abutments or retainers 22, 23 for the adjacent end convolutions of the springs 6; these parts 15, 16 constitute the input component of the damper 7. The output component is a radially extending annular member 24 (hereinafter called flange for short) which has radially outwardly extending arms 25 extending into the spaces between neighboring coil springs 6. The radially inner portion 26 of the flange 24 is affixed to the secondary flywheel 4 by rivets 27. Thus, when the parts 15, 16 and their retainers 22, 23 are caused to turn with the flywheel 2 relative to the flange 24 and its fingers 25 (i.e., relative to the secondary flywheel 4) and/or vice versa, the springs 6 are caused to store energy or additional energy and oppose such angular movements with a progressively increasing force.

The radially inner portion 26 of the flange 24 is provided with a suitably profiled zone 28 which cooperates (such as mates) with a complementary profiled zone of a friction disc 29. The profiled zone 28 and the adjacent profiled zone of the friction disc 29 are preferably designed in such a way that they form part of a hysteresis device or hysteretic damping device 30 which is ineffective through a relatively small angle whenever the flywheels 2, 4 are caused to reverse the direction of their angular movement relative to each other. The magnitude of the angle of ineffectiveness of the device 30 can be selected by appropriate shaping of the profiled zone 28 on the flange 24 and of its counterpart or complementary zone on the friction disc 29.

The friction disc 29 is made of a suitable synthetic plastic material and is adjacent one side of the radialy innermost portion of a support 31 made of a metallic sheet material and fixed to the primary flywheel 2, e.g., by rivets or in any other suitable way.

In the embodiment of FIG. 1, the heads of the fasteners 18 serve as a means for securing an intermediate portion of the support 31 to the radially extending wall 17 of the part 15 which is a constituent of the primary flywheel 2. The friction disc 29 and the wall 17 flank a washer 32 and a stressed resilient element 33. In the apparatus 1 of FIG. 1, the resilient element 33 is a diaphragm spring which is installed (and stressed in the direction of the axis 5) by the wall 17 and washer 32.

The means 3 for centering the flywheels 2 and 4 relative to each other (in the direction of the axis 5 as well as radially of such axis) comprises two bearings, namely a plain radial bearing (resembling or constituting or acting as a journal bearing) and an axial or thrust bearing which operates between two at least substantially radially extending surfaces provided directly on the two flywheels or on parts which are affixed to the respective flywheels. A first component of the centering means 3 is a sleeve-like part 34 constituting the axially extending part of a member 35 having an L-shaped cross-sectional outline. The part 34 (hereinafter called sleeve for short) is a constituent of the radial bearing, and an annular washer-like part 36 of the member 35 is a constituent of the axial or thrust bearing of the centering means 3. The washer-like part 36 (hereinafter called collar for short) is of one piece with one axial end of the sleeve 34 and is located between the wall 17 of the primary flywheel 2 and the adjacent radially innermost portion of the secondary flywheel 4. In this embodiment of the improved torsional vibration damping apparatus, the collar 36 is fixedly secured to the primary flywheel 2, e.g., by resorting to mechanical fasteners (such as rivets) or to bonding (e.g., welding). Furthermore, when the primary flywheel 2 is fixedly secured to the output component of a prime move by the axially parallel fasteners 18, the heads of such fasteners perform the additional function of urging the collar 35 against the radial wall 37.

In accordance with a modification which is not shown in the drawings, the sleeve 34 can be made of one piece with the radial wall 17 of the primary flywheel 2, e.g., by resorting to a deep drawing or upsetting technique.

The wall 17 of the primary flywheel 2 and the collar 36 of the member 35 of the centering means 3 are provided with aligned openings (e.g., circular bores or holes) for the externally threaded shanks of the fasteners 18. The just mentioned openings of the wall 17 and collar 36 register with openings 37 which are provided in the secondary flywheel 4 and serve to provide a path for movement of the working end of a suitable tool or implement (such as a screw driver) into engagement wit the slots or otherwise configurated recesses in the heads of the fasteners 18.

If the secondary flywheel 4, the clutch 9 and the clutch disc 13 are assembled into a module for attachment to the primary flywheel 2 prior or subsequent to connection of the flywheel 2 to the output component of the prime mover by means of the fasteners 18, the clutch disc 13 and/or the housing or body of the clutch 9 and/or the clutch spring 9a (e.g., a diaphragm spring) can also be provided with openings (shown but not referenced in FIG. 1) which register (at least in part) with the openings 37 and thus enable a tool to reach the heads of the fasteners 18, either to detach the flywheel 2 from the prime mover or to connect the flywheel 2 with the prime mover.

The sleeve 34 extends axially into a recess or socket 38 defined by the radially innermost portion of the secondary flywheel 4. The cylindrical internal surface 39 of the secondary flywheel 4 in the socket 38 is adjacent to and closely follows the outline of the cylindrical external surface 40 of the collar 34. A cylindrical bearing sleeve 41 of the centering means 3 is installed between the cylindrical surfaces 39, 40 to serve as a means for actually determining the radial play (or the extent or the absence of radial play) between the flywheels 2 and 4. The illustrated sleeve 41 is actually an elongated cylindrical split ring (see FIG. 2) having an axially parallel slot or slit 43a bounded by end faces (not referenced in FIG. 2) which abut each other and thus urge the external surface of the bearing sleeve 41 against the internal surface 39 in the socket 38 of the secondary flywheel 4 when the centering means 3 is properly assembled and installed between the primary flywheel 2 and the secondary flywheel 4.

One end of the bearing sleeve 41 is of one piece with (i.e., a part of) an outwardly extending collar 41b (see also FIGS. 2 and 3) which is located between the radially extending surface of the adjacent portion of the support 31 and the radially extending surface of the adjacent (radially innermost) portion of the secondary flywheel 4.

It is possible to make the collar 41b as a separately produced part which is affixed to the cylindrical part 41a or is installed between two radially extending surfaces of the flywheels 2, 4 at a location adjacent to or even remote from the surfaces 39 and 40. The inner diameter of such separately produced collar can exceed, or it can be less than, the diameter of the cylindrical part 41a.

In the apparatus 1 of FIGS. 1 to 3, the collar 41b of the bearing sleeve 41 abuts a plastic washer 42 which is adjacent the primary flywheel 2, and more specifically the collar 36 of the member 35. The washer 42 is preferably mounted in such a way that it cannot turn relative to the primary flywheel 2. This can be achieved by providing the radially outer marginal portion of the washer 42 with recesses for portions of the heads of the fasteners 18.

In FIGS. 2 and 3, the reference character 43 denotes a converted blank which constitutes the bearing sleeve 41 including the cylindrical portion 41a and the radially extending washer-like portion or collar 41b at one axial end of the portion 41a. The blank 43 can constitute a cylindrical part or a washer-like part which is thereupon treated in suitable machines to be converted into the bearing sleeve 41, i.e., into a body having a longitudinally slotted cylindrical portion 41a and a radially outwardly extending washer-like portion 41b. The axially parallel straight slot 43a can be replaced with a slot having a slant relative to the longitudinal axis of the cylindrical portion 41a.

The outer diameter 44 of the sleeve-like portion 41a slightly exceeds the diameter of the cylindrical internal surface 39 in the socket 38 of the secondary flywheel 4. This ensures that, when the portion 41a is forcibly introduced into the socket 38, the diameter of the sleeve-like portion 41a is reduced and the two axialy parallel faces bounding the slot 43a are caused to bear against each other. This causes the generation of a force which acts tangentially of and upon the portion 41a so that the external surface of the portion 41a bears upon the surface 39 in the socket 38 of the secondary flywheel 4 (see FIG. 4). The frictional engagement between the external surface of the thus stressed portion 41a and the surface 39 suffices to ensure that the bearing sleeve 41 and the flywheel 4 are adequately held against axial movement relative to each other.

When the portion 41a is caused to assume a condition of adequate frictional engagement with the internal surface 39, the collar 41b of the bearing sleeve 41 is caused to abut a complementary radially extending surface 4a of the secondary flywheel 4.

If the inner diameter 46 (see FIG. 3) of the collar 41b is in the range of between 30 and 50 millimeters, preferably between 35 and 45 millimeters, the diameter of the surface 39 in the socket 38 of the flywheel 4 can be less than the diameter 44 by a valve in the range of between 0.05 and 0.25 millimeter. In other words, forcible insertion of the slotted cylindrical portion 41 a into the socket 38 can entail a reduction of the outer diameter 44 of the portion 41 a by a small fraction (such as 0.25) or a minute fraction (such as 0.05) of one millimeter.

Once the step of establishing an at least substantially clearance-free fit (such as a press fit) between the external surface of the cylindrical portion 41a of the bearing sleeve 41 and the respective flywheel (such as the flywheel 4, see FIG. 4) is completed, the next step involves calibrating the other (internal) surface 45 of the portion 41a by resorting to a suitable male calibrating tool. FIG. 4 shows a mandrel 50 which can be introduced into the portion 41a of the bearing sleeve 41 (from that end which is of one piece with the collar 41b) in the direction indicated by an arow 53. The mandrel 50 has a cylindrical central portion 52 between two frustoconical end portions which are or which can be mirror images of each other. This renders it possible to calibrate the surface 45 of the cylindrical portion 41a in the socket 38 of the fywheel 4 by pushing or pulling the mandrel through the portion 41a.

The advancement of the mandrel 50 through the slotted portion 41a of the bearing sleeve 41 can bring about several beneficial effects. Thus, the inner diameter 52' of the portion 41a can be calibrated to match or to very closely approximate the diameter of the cylindrical central portion 52 of the mandrel. Furthermore, such passage of the mandrel 50 through the slotted portion 41a can entail and normally entails a hardening and/or densification of the material of the portion 41a along the internal surface 45. All this contributes to longer useful life of the bearing sleeve 41. Still further, the calibrating step entails a desirable and controlled reduction of roughness of the internal surface 45 to an optimum value or to an optimum range of roughnesses. In many instances, it is desirable to carry out the calibrating operation which is shown in FIG. 4 in such a way that the surface roughness of the surface 45 of the internally calibrated slotted portion 41a is in the (Rz) range of between 1.5 and 8 micrometers, preferably between 3 and 6 micrometers.

In fact, the calibrating operation can be resorted to in order to achieve a surface roughness (Ra) of less than 0.8 micrometer. It is often highly satisfactory if the surface roughness is in the range of 0.3 to 0.6 micrometer. The roughness parameters Ra and Rz in the present context are used in accordance with their internationally accepted definitions. Ra measures the average fluctuation of a given surface profile within a given sampling length and Rz measures the maximum peak-to-valley difference within a given sampling length. Ra and Rz are commonly measured in micrometer or micro-inch units and are officially defined in "International Standard ISO 4287, Geometrical Product Specifications (GPS)—Surface texture: Profile method Terms, definitions and surface texture parameters".

At least some of the aforementioned Norms also contain information regarding the measurement of the roughnesses prior and subsequent to calibration.

Another important advantage of the steps which were described with reference to FIG. 4 (namely the establishment of a desirable fit between the external surface of the slotted portion 41a and the internal surface 38 of the flywheel 4, and the calibration of the internal surface 45 of the properly inserted portion 41a) is that the internal surface 45 is no longer out of round or that, at the very least, such defectiveness of the internal surface 45 is reduced to an acceptable value. Of course, such improvement of the configuration of the internal surface 45 can be achieved only if this internal surface was out of round prior to insertion of the portion 41 a into the socket 38 and was not eliminated as a result of such insertion, or if the internal surface 45 became out of round as a result of insertion of the portion 41a into the socket 38 of the flywheel 4.

Any improvement of roundness of the internal surface 45 of the slotted portion 41 a in the socket 38 contributes significantly to a more satisfactory contact pattern between the internal surface 45 of the portion 41a, having been calibrated, and the external surface 40 of the part 34, and such satisfactory contact pattern is established and effective right from the start, i.e., while the centering means 3 is still new. This, in turn, ensures a more satisfactory running in of all such parts of the centering means 3 which are to move relative to each other. Such desirable "breaking in" of the centering means 3 entails a pronounced reduction of wear (when compared with conventional centering means), i.e., in longer useful life of the centering means and longer satisfactory operation of the combined axial and radial bearing (i.e., the play between the flywheels 2 and 4 (not only in the axial direction but also in the radial direction of the apparatus) remains minimal or at least acceptable for long periods of time).

As already mentioned hereinbefore, the bearing sleeve 41 of FIGS. 2 and 3 can be made of suitable metallic sheet material. For example, the blank 43 which is converted into the bearing sleeve 41 can consist of sheet steel. When the conversion of the blank 43 into the bearing sleeve 41 is completed, the latter assumes an L-shaped cross-sectional outline (this is shown in FIG. 3, as at 47). However, it is equally possible to make the blank 43 (i.e., the bearing sleeve 41) of several materials other than steel. For example, the blank 43 can be made of aluminum or bronze or of a plastic material, such as a thermoplastic or a thermosetting plastic or a combination of two or more different plastic materials.

The thickness of the blank 43 can be in the range of between 0.5 and 1.6 millimeters.

It is further possible (and often advisable or even necessary) to coat at least one surface of the centering means 3 (such as the internal surface 45 of the slotted portion 41a) with one or more layers or coats 48 (see FIGS. 2 and 3) of a suitable quality-enhancing material. It has been found that two coats are not only satisfactory but even most satisfactory to enhance certain important characteristics of the respective constituent or constituents of the centering means 3. For example, the internal surface 45 can be provided with one or more layers or coats of bronze or an equivalent alloy; each bronze layer (or a combination of several superimposed bronze layers) can have a thickness within the range of between 0.1 and 0.5 millimeter, preferably between 0.2 and 0.4 millimeter.

It is further possible to provide an additional smoothness enhancing layer on top of the layer or layers 48, e.g., an additional layer having a thickness of between 0.02 and 0.08 millimeter, preferably close to 0.05 millimeter. For example, the smoothness enhancing layer can consist of polytetrafluorethylene or of polytetrafluorethylene further containing other substances, for example, silicone and/or graphite.

If the layer 48 contains bronze, such material can be applied by resorting to a sintering or rolling technique. It is often desirable to provide the surface 45 with one or more coats exhibiting a certain porosity, and the pores of such layer or layers can receive additional smoothness enhancing and friction reducing substances, such as lubricants (e.g., oil). Examples of presently preferred materials which form the layer 48 and/or a layer on top of the layer 48 and/or a smoothness enhancing substance in a porous layer are polytetrafluorethylene, graphite, lead, tin, oil, grease and silicone.

Still further, it is normally desirable to select the material of the blank 43 and/or of the layer or layers 48 (and additional layer or layers, if necessary) in such a way that the bearing sleeve 41 will be capable of standing elevated temperatures. For example, the materials) of the bearing sleeve 41 should be selected in such a way that the centering means 3 will be capable of standing temperatures of up to or in the range of 250° C. for certain extended periods of time (for example, between 15 and 30 minutes) without in any way affecting the condition and/or the operation of the centering means 3 or of the entire torsional vibration damping apparatus.

The bearing sleeve 41 can cooperate with the sleeve-like axial extension 34 of the member 35 or with a similar extension which is of one piece with the primary flywheel 2. As concerns the quality of the external surface 40 of the extension 34 (or of the corresponding surface of an extension which is of one piece with the flywheel 2), the tool or tools which is or are utilized for the making of such parts can be readily designed or operated to ensure that at least the surface 40 is finished to a degree of smoothness, hardness and/or other desirable quality which suffices to ensure that the surfaces 40 and 45 will slide relative to each other in a manner which is most desirable or most advantageous for satisfactory operation of the centering means 3. For example, the external surface 40 can be treated by resorting to a female calibrating or embossing tool. In addition to or in lieu of such calibration, the surface 40 can be roller burnished in order to improve its quality at least as concerns the roughness of the finished surface.

A burnishing treatment is particularly desirable and advantageous if the preceding treatment of the surface 40 involved a material removing operation such as turning or grinding or an equivalent operation. Burnishing is a procedure which can be resorted to with similar advantage for the treatment of the internal surface 39 surrounding the socket or recess 38 in the secondary flywheel 4 before such surface is engaged by the external surface of the slotted portion 41a of the bearing sleeve 41. Burnishing is also known as smooth rolling.

When the centering means 3 is new, the radial play between the surfaces 40 and 45 is in the range of 0 and 0.05 millimeter. Furthermore, such radial play should not rise above 0.15 millimeter during the useful life of the torsional vibration damping apparatus 1. A presently preferred and acceptable play is about 0.1 millimeter.

An important advantage of a torsional vibration damping apparatus wherein the constituents of the centering means 3 are pretreated, assembled and finished in the aforedescribed manner is that, at least when the apparatus is not under load, the basic or initial frictional torque is surprisingly low. Such initial frictional torque does not exceed 2 newton meters and is normally well below such value. The materials and the dimensions (particularly diameters) of those parts of the centering means which are called upon to turn and/or otherwise move relative to each other can be or are often selected in such a way that, when the friction clutch 9 is actuated, the frictional torque does not exceed 5 newton meters; this ensures that the axial or thrust bearing of the centering means 3 guarantees a satisfactory axial positioning of the flywheels 2 and 4 relative to each other. This applies in particular when the improved torsional vibration damping apparatus (such as the apparatus 1) is utilized in the power train of a passenger car. The frictional torque of 5 newton meters can be exceeded if the torsional vibration damping apparatus is installed in the power train of a truck or another heavy-duty motor vehicle.

In order to ensure that the centering means 3 will produce a relatively small basic frictional torque, it is advisable to ensure tat the diameter of at least one of the two (radial and axial) bearings be as small as possible. This is accomplished in the apparatus 1 of FIGS. 1 to 3 in that the diameter of the axial bearing including the collar 41b is reduced to a minimum, namely to a diameter which is smaller than that of the annular array of fasteners 18. In fact, the centering means 3 is designed in such a way that the diameter of the radial bearing (including the split portion 41a of the sleeve 41) is also less than the diameter of the aforementioned annular array of the fasteners 18.

The bearing sleeve 41 can be replaced with a sleeve wherein the cylindrical portion is a circumferentially complete cylinder (i.e., with the slot 43a omitted). It is then possible to apply the layer(s) or coat(s) 48 to the external surface of the circumferentially complete cylindrical portion to come into sliding engagement with the surface 39 surrounding the recess or socket 38 in the secondary flywheel 4. If the improved torsional vibration damping apparatus employs a bearing sleeve of the just outlined character, the unslotted cylindrical portion of such sleeve can be a press fit on the part 34, i.e., the modified bearing sleeve can be non-rotatably affixed to the primary flywheel 2. This means that, in such apparatus, the radially extending collar 41*b* must be free to rotate relative to the secondary flywheel 4. The friction reducing coat or layer 48*a* which is shown in FIG. 3 at the left-hand side of the collar 41*b* is then transferred to the other side of the collar 41*b*, namely to that side which is in sliding contact with the adjacent surface of the secondary flywheel 4.

If the modified apparatus further employs a washer corresponding to the washer 42, such washer is also transferred to the other side of the collar 41*b*, namely between the collar 41*b* and the adjacent radially extending surface of the radially innermost portion of the secondary flywheel 4.

In order to prevent contamination of the improved centering means 3 (or of the aforedescribed modifications of such centering means), the latter can be provided with suitable covers, sealing means or like impurities intercepting means serving to prevent the impurities from penetrating between the surfaces which are to be free for angular and/or axial movement relative to each other. For example, the just discussed covers, sealing means of analogous impurities intercepting means can be attached to or made of one piece with the parts which are adjacent to the surfaces that must turn and/or move axially relative to each other.

For example, the secondary flywheel 4 can be provided with a roof-shaped projection or with a sealing element which overlies and shields the sleeve 41 at least in the region of the bearing part 34. Furthermore, the washer 42 can be provided with an annular portion which extends in the direction of the axis 5 to overlie certain portions of the secondary flywheel 4 and/or to actually contact the secondary flywheel to thus provide a rudimentary seal (e.g., a so-called diaphragm gland or gap seal) for those parts of the centering means 3 that constitute the thrust or axial bearing between the flywheels 2 and 4.

FIGS. 4 to 8 illustrate various steps of the improved modes of assembling and installing centering means in accordance with the present invention. FIG. 4 shows a bearing sleeve 41 with the cylindrical portion 41*a* already received (e.g, a press fit) in the socket 38 of the secondary flywheel 4. The character 49 denotes that part of the secondary flywheel 4 which surrounds the socket 38 and provides the internal surface 39 (see FIG. 1) which is engaged by the external surface of the slotted portion 41*a*. The part 49 is the radially innermost part of the flywheel 4. As already explained hereinbefore, the diameter 51 of the central or median portion 52 of the calibrating mandrel 50 is selected with a view to at least approximate the desired diameter 52' of the internal surface 45 of the slotted portion 41*a* of the bearing sleeve 41.

The conicities of the two end portions of the mandrel 50 which is shown in FIG. 4 are exaggerated for the sake of clarity. As a rule the conicities of such end portions are in the range of between 1 and 3°. In fact, such conicities can be even less than 1°. The surface roughness Rz of the peripheral surface of the cylindrical median portion 52 of the mandrel 50 is normally in the range of 0.4 to 3 micrometers and the value Ra is in the range of between 0.04 and 0.35 micrometer.

The calibrating operation (which involves an advancement of the mandrel 50 through the slotted portion 41*a* of the bearing sleeve 41) can readily eliminate any deviations of the diameter of the internal surface 45 from an optimum value regardless of whether such deviations were attributable to the carrying out of the press fitting step (i.e., to forcible introduction of the slotted portion 41*a* into the socket 38 of the secondary flywheel 4) and/or to departures of the wall thickness of the portion 41*a* from an optimum wall thickness. Some departures of the diameter of the surface 45 from an optimum diameter are also attributable to manufacturing tolerances of the bearing sleeve 41 and/or of the radially innermost portion 49 of the secondary flywheel 4.

The calibrating step can reduce the departure of the diameter 52' of the internal surface 45 from an optimum or acceptable diameter by 40% or even much more. For example, the calibrating operation involving the penetration of the cylindrical portion 52 of the mandrel 50 through the slotted portion 41*a* can reduce the departure of the internal surface 52' from an optimum value in such a way that the initial departure of 50 micrometers is reduced to not more and possibly much less than approximately 30 micrometers.

If the diameter of the cylindrical portion 52 of the mandrel 50 is between 30 and 50 mm, it is advisable to select the dimensions of the mandrel (for the purpose of obtaining a satisfactory diameter 52') in such a way that the overlap between the diameters 51 and 52' is in the range of between 0.03 and 0.15 millimeter, most preferably between 0.06 and 0.12 millimeter. The calibrating step involves an enlargement of the diameter 52' of the internal surface 45 in the range of between 5 and 40%, preferably to between 8 and 25% of the aforementioned range. The extent to which the diameter 52' of the internal surface 45 is enlarged depends from the design of the bearing sleeve 41 and from the nature of the material of the secondary flywheel 4 in the region of its radially innermost portion 49. As a rule, the final internal diameter 52' of the internal surface 45 of the calibrated portion 41*a* is less than the diameter 51 of the cylindrical central portion 52 of the calibrating mandrel 50. This is attributable to certain elasticity or resiliency of the parts which carry out and are subject to the calibrating operation.

It is often advisable or desirable to contact the calibrating and/or calibrated surfaces with a lubricant or any other suitable slippage enhancing medium. For example, such medium (e.g., oil) can be applied in the form of a very fine spray. The application can take place by spraying such medium against the internal surface 45 of the portion 41*a* of the bearing sleeve 41 and/or against the external surface of the calibrating mandrel 50. Such application can be effected preparatory to and/or in the course of the calibrating step.

The extent to which the diameter 51 of the cylindrical central section or portion 52 of the mandrel 50 exceeds the diameter 52' of the uncalibrated surface 45 of the slotted portion 41*a* of the bearing sleeve 51 must be selected in dependency upon one or more parameters, including the nature of the material which forms the layer or layers 48 (if such layer or layers is or are applied prior to the calibrating step), the material of the slotted portion 41*a*, the dimensions (such as the thickness) of the portion 41*a*, the material of the radially innermost portion 49 of the secondary flywheel 4, the resiliency of the portion 49, and/or the characteristics (such as the dimensions and/or the resiliency) of the separately produced part (if any) which performs the function of the radially innermost portion 49 of the flywheel 4 and is connected to one of the flywheels.

FIGS. 5 and 6 illustrate two successive steps of a method which can be carried out at two different stations. The tool 54 which is shown in FIG. 5 serves to forcibly introduce the (slotted or unslotted) cylindrical portion of a blank 41B into the socket 38 of the secondary flywheel 4. When the introducing step is completed (see FIG. 6), the internal surface of the cylindrical portion of the partially converted blank 41B' is calibrated by the mandrel 50 which is reciprocable relative to the blank 41B' by a suitable motor 55, e.g., by the reciprocable piston rod of a double-acting fluid-operated cylinder and piston unit. The tool 50 of FIG. 6 is installed and operated in a manner to carry out a so-caled dual or multistage calibration of the internal surface of the cylindrical portion of the partially converted blank 41B', namely to complete a first stage of calibration during penetration into the blank 41B' in the socket 38 of the flywheel 4, and to thereupon complete a second (final) stage during extraction from the twice calibrated cylindrical portion of the properly calibrated bearing sleeve.

The just described method can be modified in a number of ways. For example, the described inserting and calibrating steps can be carried out at one and the same station. Thus, the motor 55 or an equivalent supporting and displacing device for the tools 54 and 50 can be designed to detachably support the tool 54 for insertion of the blank 41B into the socket 38 of the flywheel 4, and thereupon detachably support the tool 50 for the purposes of calibrating (in one or more stages) the internal surface of the cylindrical portion of the inserted partially converted blank 41B'.

The steps of carrying out the insertion (fitting) and the calibration at one and the same station are shown in FIGS. 7 and 8. As can be seen in FIG. 7, the tool 54 includes a radially extending portion 56 which engages the collar 41b of a blank 43 having a slotted cylindrical portion 41a and pushes the blank 43 into the socket 38 of the secondary flywheel 4. The mandrel 50 is affixed to the leading end of the tool 54 or it can be made of one piece with the tool. Slipping of the blank 43 onto the tool 54 adjacent the portion 56 presents no problems if the portion 41a is provided with a slot (see the slot 43a in FIG. 2).

The next (calibrating) step involves an upward movement of the tool 54 so that the mandrel 50 is pulled through the fully inserted portion 41 a to ensure that the inner diameter of the portion 41a at least approximates the desired value. It is clear that the inserting or anchoring step of FIG. 7 must be carried out in such a way that the next-following calibrating step (FIG. 8) does not result in any (even partial) extraction of the portion 41 a from the socket 38. This can be readily achieved by proper selection of various diameters to thus ensure that the blank 43 can be forcibly pushed into the socket 38 but its portion 41a cannot be extracted from such socket in response to upward movement of the tool 54 as shown in FIG. 8. Alternatively, the collar 41b can be supported from above while the mandrel 50 is caused to move upwardly relative to the portion 41 a as soon as the insertion of the portion 41a into the socket 38 of the flywheel 4 is completed.

If the radially extending portion 41b of the blank 43 of FIG. 7 is omitted, the portion 56 of the tool 54 bears directly upon the adjacent end of the preferably slotted portion 41a.

FIGS. 9 through 14 illustrate portions of additional dual mass torsional vibration damping apparatus which are constructed and assembled in accordance with the method of the present invention. More specifically, FIGS. 9 to 14 illustrate additional modes of assembling and installing centering means which embody the invention but depart from the centering means 3 of the apparatus 1 which is shown in FIG. 1.

Referring to the centering means 103 of FIG. 9, the plastic washer 142 (replacing the washer 42 in the apparatus 1 of FIG. 1) is provided with projections 142a extending into complementary recesses of the member 135 which is affixed to the primary flywheel 102 (e.g., by fasteners corresponding to the fasteners 18 shown in FIG. 1). The projections 142a are provided at that side of the washer 142 which faces away from the collar 141b of the bearing sleeve 141, and their purpose is to ensure that the washer 142 shares all angular movements of the flywheel 104.

The plastic material of the washer 142 can contain a suitable lubricant (such as oil). For example, the washer 142 can be provided with pores which receive minute droplets of oil. This washer can be reinforced by glass fibers or the like. A presently preferred material for the making of the washer 142 is polyetheresterketone (PEEK) which exhibits the important advantage that it can stand elevated temperatures. The bearing sleeve 141 of the centering means 103 is surrounded by the axially extending cylindrical portion 158 of the member 157 which is made of a suitable metallic sheet material and the radially outer portion of which (the upper portion, as viewed in FIG. 9) is affixed to a secondary flywheel (not shown in FIG. 9 but corresponding to the flywheel 4 in the apparatus 1 of FIG. 1). The means for securing the radially outwardly extending portion of the member 157 to the secondary flywheel can include fasteners corresponding to an/or performing the function of the rivets 27 in the apparatus of FIG. 1.

The member 157 can be provided with the cylindrical portion 158 by resorting to a procedure other than removal of material from a blank which is to be converted into the finished member 157 of FIG. 9. For example, the portion 158 can be formed by resorting to a deep drawing operation. As far as the quality or finish of the internal surface of the cylindrical portion 158 is concerned, a desired or required quality or finish can be achieved by precision drawing as long as such treatment suffices to permit immediate insertion of the cylindrical portion of the bearing sleeve 141, i.e., without necessitating turning, grinding, polishing or other material removing treatment or treatments.

The centering means 203 of FIG. 10 comprises a bearing sleeve 241 which includes only a cylindrical portion 241a located between a member 257 and the axial extension of a member 235 corresponding to the member 135 in the apparatus including the structure of FIG. 9. The member 257 is a casting or a forging; however, it is equally possible to employ a member which corresponds to the suitably deformed sheet metal member 157 of FIG. 9.

The washer 242 is in direct contact with the adjacent radially extending surface of the member 257 and is also provided with projections (corresponding to the projections 142a of the washer 142) which are anchored in the complementary recesses of the radially extending part of the member 235.

The centering means 303 of FIG. 11 employs a bearing sleeve 341 with a radially extending collar 341b directly abutting the adjacent radially outwardly extending portion of the member 335, i.e., the washer (2, 142 or 242) is omitted. Thus, the collar 341b of the bearing member 341 is in direct metal-to-metal contact with the part 335 which is assumed to be affixed to or to form part of the primary flywheel 302. For example, the connection between the part 335 and the flywheel 302 can include fasteners corresponding to the connecting means 18 shown in FIG. 1.

FIG. 12 illustrates a portion of a torsional vibration damping apparatus wherein the centering means 403 comprises a two-piece bearing sleeve including a cylindrical portion 403a located radially outwardly of a radially extending portion or collar 403b. The collar 403b is located radially inwardly and the sleeve 403a is located radially outwardly of an annular array of fasteners serving to secure the primary flywheel 402 to the rotary output component of a prime mover, e.g., an internal combustion engine in the power train of a motor vehicle. FIG. 12 merely shows the head of a single fastener 418; the head of such fastener is accessible through an opening 460a provided in a disc-shaped member 460 forming part of or affixed to the secondary flywheel 404 of the apparatus embodying the structure of FIG. 12.

The portion 403a of the composite centering means 403 includes a cylindrical sleeve 441a which is a press fit in the adjacent portion of the secondary flywheel 404 and slidably surrounds the external surface of the adjacent axially extending tubular portion 434 of a sheet metal member 435 affixed to the primary flywheel 402. The radially extending portion 436 of the member 435 is secured to the flywheel 402 by means of the aforementioned fasteners 418. The radially inner or innermost part of the portion 436 is adjacent to one side of a collar constituting or forming part of the portion 403b of the composite centering means 403. The other side of the portion 403b abuts a washer 442 having projections 442a which are anchored in the member 435, i.e., the washer 442 cannot turn relative to the primary flywheel 402.

The radially innermost portion 459 of the secondary flywheel 404 has a radially extending surface which is adjacent the respective side of the washer 442. The portion 459 is a separately produced part which is made of sheet metal, which includes the aforementioned portion 460 (having the openings 460a) and which is affixed to the main or major portion or mass of the flywheel 404. FIG. 12 shows that the connection (by means of rivets 427, only one of which is shown in FIG. 12) between the separately produced part 459 and the major portion of the secondary flywheel 404 is located radially outwardly of the portion 403a of the composite centering means 403. The rivets 427 further serve to secure the secondary flywheel 404 to a radially extending device 424 forming part of the input or output element of a damper which operates between the flywheels 402, 404 in a manner similar to that of the operation of the damper 7 in the apparatus 1 of FIG. 1.

The openings 460a in the portion 460 of the member 459 register with suitable openings in the clutch disc and/or in the clutch spring of a clutch (corresponding to the clutch disc 13 and the clutch 9 in the apparatus 1 of FIG. 1) if the clutch disc, the clutch and the flywheel 404 are assembled into a module adapted to be affixed to the flywheel 402. The openings in the clutch disc and/or in the spring of the cutch then afford access to the openings 460a, i.e., to the working end of a tool which is used to attach the fasteers 418 to or to detach such fasteners from the output component of a prime mover.

An important advantage of the apparatus which embodies the structure of FIG. 12 is that the axial bearing (portion 403b of the centering means 403) can be placed close to the common axis of the flywheels 402 and 404. This renders it possible to minimize or at least greatly reduce the magnitude of friction torque which is generated by the axial bearing and develops between the flywheels 402 and 404.

The projections 442a of the washer 442 cooperate with the portion 436 of the member 435, i.e., they prevent rotation between the washer 442 and the primary flywheel 402. However, it is equally possible to establish a non-rotatable connection between the washer 442 and the flywheel 404; the washer 442 is then free to turn relative to the primary flywheel 402.

FIG. 13 shows a portion of a further apparatus wherein the centering means 503 employs a bearing sleeve 541 resembling or being identical with the bearing sleeve 41 in the apparatus 1 of FIG. 1 or the bearing sleeve 141 in the apparatus embodying the structure shown in FIG. 9. The collar 541b of the bearing sleeve 541 cooperates with a washer 542 having projections 542a which hold the washer 542 against rotation relative to a washer-like annular support 560 which is adjacent the radially extending portion of the member 535. Thus, the washer 542 can turn relative to the collar 541b which rotates with the secondary flywheel but the washer 542 cannot turn relative to the support 560 which cannot rotate relative to the primary flywheel. The support 560 is or can be made of steel and includes projections 560a which extend into complementary recesses of the member 535. The projections 560a can be offset relative to the projections 542a in the circumferential direction of the flywheels. The details of one of the projections 560a are shown in FIG. 14; such projection can include a lip or tongue which is bent out of the support 560 and extends into an axially extending opening in the radially extending portion of the member 535.

A difference between the centering means 503 of FIG. 13 and the centering means 603 of FIG. 14 is that the latter does not employ a washer corresponding to the washer 542. Thus, the radially extending collar 541b of the bearing sleeve 541 shown in FIG. 14 directly abuts the adjacent side of the support 560 which rotates with the primary flywheel.

The centering means which are shown and described in this specification can be utilized with advantage in torsional vibration damping apparatus which are illustrated and described in commonly owned copending patent application Ser. No. 09/128,646 filed Aug. 4, 1998, and corresponding to German patent application Serial No. 197 33 723 filed Aug. 4, 1997. The disclosures of these German and U.S. patent applications are also incorporated herein by reference.

The exact construction and the materials of the flywheels and/or other parts which cooperate with the improved centering means (i.e., whether made of a metallic or plastic material, whether made as castings or forgings, whether porous or nonporous, whether shaped in material removing or deforming machines, and so forth) will depend upon the intended use and desired characteristics of the torsional vibration opposing apparatus which embody such centering means.

The improved method and apparatus are susceptible of numerous additional modifications some of which will be enumerated hereinbelow.

It is normally preferred to design the centering means in such a way that the external surface of the cylindrical part (such as 41a) of the bearing sleeve (such as 41) is non-rotatably inserted into a socket (such as the socket or recess 38 in the radially innermost portion 49 of the secondary flywheel 4) and that the tubular or solid extension of the other flywheel (such as the primary flywheel 2 and more specifically the extension 34 of the part 35 which is affixed to the primary flywheel) rotatably extends into the cylindrical part 41a of the thus installed bearing sleeve. However, it is equally possible to have the external surface of the cylindrical portion 41a finished to such an extent that it can rotate relative to the surface 39 in the socket 38 of the secondary flywheel 4.

It is also possible to resort to honing or other material removing operations in connection with the finishing of the external and/or internal surfaces of a cylindrical portion of a bearing sleeve and/or in connection with the treatment of surfaces which come into contact with such cylindrical portion. However, surface finishing operations which involve rolling or any other suitable treatment not including removal of material are often preferred, especially when the treatment involves the finishing of the internal and/or external surface of a bearing sleeve having a minimal thickness. Moreover, a treatment not involving removal of any material is preferred whenever such treatment involves a change of the smoothness and/or diameter of a surface which is provided with a very thin layer of a wear-resistant or other material (reference may be had to the layer or layers 48 at the inner side of the cylindrical portion 41a of the bearing sleeve 41 shown in FIGS. 2 and 3). The thickness of the layer or layers 48 can be in the range of 0.01 to 0.08 millimeter; such extremely thin layers can be made, for example, of polytetrafluorethylene or molybdenum sulfide. If the layer or layers should be even thinner (e.g., with a thickness in the range of between 2 and 5 micrometers), they can be made for example of industrial diamonds.

Another important advantage of calibration of one of the surfaces on the cylindrical portion of the bearing sleeve is that this renders it possible to select the initial diameter, surface finish, hardness and/or other characteristics of the calibrated part with an extremely high degree of accuracy so that, even by taking into consideration the unavoidable wear during the useful life of the bearing sleeve, the play between the calibrated surface and the adjacent surface can remain within the desired or required range. Alternatively, and if a certain clearance is desired right from the start, calibration of one of the internal and external surfaces of the cylindrical portion of the bearing sleeve can be readily selected and regulated to achieve such initial play.

Moreover, the contact pattern between the internal or external surface of the cylindrical portion of the bearing sleeve and the adjacent surface can be readily selected in such a way that it is superior to presently achievable contact patterns; this ensures a more satisfactory running in of the bearing sleeve and a pronounced reduction of wear upon the parts which rotate relative to each other.

Lubrication of the calibrating tool and/or of the surface or surfaces to be calibrated is highly desirable and advantageous because this entails a pronounced reduction of forces which must be applied in the course of a calibrating operation. Moreover, such lubrication greatly reduces the likelihood of damage to the calibrating tool but particularly to the surface or surfaces being calibrated. Oil is one of presently preferred lubricating agents, and such agent can be applied to the surface or surfaces of the calibrating implement and/or to the surface or surfaces which are about to undergo or which are in the process of undergoing a calibrating operation.

The extent to which the diameter of a surface is changed in the course of a single-step or multiple-step calibrating operation depends on the thickness of the part which is being calibrated. Thus, if the cylindrical surface of a bearing sleeve is thin or extremely thin, a calibrating treatment can involve a pronounced change of the initial diameter; however, such change can be considerably less if the calibrating step involves the treatment of a cylindrical surface in or on a cylindrical part having a pronounced thickness.

Certain presently preferred materials for the application of one or more layers or coats (such as 48) prior to calibration include polyether etherketone (PEEK), polyamide and polyetherimide. Specific qualities of such coating materials can be enhanced by addition of requisite amounts of dry lubricating agents such as graphite, inserts of polytetrafluorethylene and/or others. For example, such additives and/or inserts can enhance the smoothness of the surface which is to undergo a calibrating treatment.

That surface of the input or output member of the apparatus (i.e., a surface of the primary or the secondary flywheel) which is to come into sliding contact with the calibrated surface of a properly installed bearing sleeve can undergo a finishing treatment, preferably a treatment (such as deep drawing or precision deep drawing) which does not involve removal of material from such surface.

Still further, it is possible to provide the primary flywheel or the secondary flywheel with a cylindrical internal sleeve or external sleeve (such as the part 34 in the apparatus 1 of FIG. 1) having a surface which actually contacts the bearing sleeve of the centering means (such as 3). This renders it possible to make the major part of the input or output member of a less expensive material.

The friction clutch (such as the clutch 9 in the apparatus of FIG. 1) can be omitted if the improved apparatus is directly coupled with certain types of transmissions, e.g., those known as continuously variable transmissions (CVT). The reason is that such transmissions normally embody clutches. The same holds true if the improved apparatus is to transmit torque to an automatic or automated transmission.

The placing of the radial bearing radially outwardly of the thrust bearing (reference should be had again to FIG. 13) is particularly desirable if the secondary flywheel carries a friction clutch. This reduces the frictional torque. The thrust bearing takes up axial forces which develop during actuation of the friction clutch, i.e., during changes of the bias of the clutch spring.

If the bearing sleeve is to contact and slide relative to that part or those parts of a primary or secondary flywheel which is or which are made of a sheet material, it is advisable to treat the respective surface or surfaces of the primary or secondary flywheel in accordance with a deep drawing technique. This has been found to contribute significantly to the surface finish of the treated surface or surfaces, especially as far the roughness (or lack of roughness) is conv- erned.

The treatment of surfaces which are brought into sliding contact with the part or parts of the axial bearing of the improved centering means is or can be analogous to the aforedescribed treatment of surfaces which contact the radial bearing of the centering means.

Without further analysis, the foregoing will so fully reveal the gist of the present invention that others can, by current knowledge, readily adapt it for various applications without omitting features that, from the standpoint of the prior art, fairly constitute essential characteristics of the generic and specific aspects of the above outlines contribution to the art of torsional vibration dampers and, therefore, such adaptations should and are intended to be comprehended within the meaning and range of equivalence of the appended claims.

What is claimed is:

1. A method of making an apparatus which is to damp torsional vibrations and comprises at least one input member, at least one output member rotatable with and relative to the input member about a common axis, and a bearing which is interposed between the input and output members to center the input and output members at least against excessive movements relative to each other radially of the common axis and comprises a sleeve having external and internal surfaces, comprising the steps of:

establishing an at least substantially clearance-free fit between one surface of the sleeve and a complementary surface of one of the input and output members;

calibrating the diameter of the other surface of the sleeve; and thereafter juxtaposing the other surface of the sleeve with a complementary surface of the other of the input and output members.

2. The method of claim 1, wherein one of the complementary surfaces is an external surface of an extension of the respective one of the input and output members.

3. The method of claim 1, wherein one of the complementary surfaces overlies the other complementary surface in the direction of the common axis of the input and output members.

4. The method of claim 1, wherein the one surface is the external surface of the sleeve and said calibrating step includes introducing a male calibrating tool into the sleeve.

5. The method of claim 1, wherein the one surface is the internal surface of the sleeve and said calibrating step includes introducing the sleeve into a female calibrating tool.

6. The method of claim 1, wherein said calibrating step includes hardening the sleeve at the other surface thereof.

7. The method of claim 1, wherein said calibrating step includes densifying the sleeve at the other surface thereof.

8. The method of claim 1, wherein said calibrating step includes imparting to the other surface of the sleeve a roughness in the range of between Rz 1.6 and 6 micrometers.

9. The method of claim 8, wherein said range is between Rz 3 and 5 micrometers.

10. The method of claim 1, wherein said calibrating step includes imparting to the other surface of the sleeve a roughness of less than 0.8 micrometer.

11. The method of claim 10, wherein said roughness is in the range of between 0.3 and 0.6 micrometer.

12. The method of claim 1, wherein said calibrating step comprises reducing the out-of-roundness, if any, of the internal surface of the sleeve.

13. The method of claim 1, wherein said calibrating step comprises lubricating the other surface of the sleeve.

14. The method of claim 13, wherein the lubricating step includes contacting the other surface of the sleeve with oil.

15. The method of claim 1, wherein the calibrating step includes lubricating a calibrating surface of a calibrating tool and contacting the outer surface of the sleeve with the calibrating surface of the tool.

16. The method of claim 1, wherein the other surface is the internal surface of the sleeve and said calibrating step includes inserting into the sleeve a male calibrating tool having a maximum outer diameter which exceeds a desired diameter of the internal surface of the sleeve by a value in the range of between 0.03 and 0.15 millimeter.

17. The method of claim 16, wherein said value is between 0.06 and 0.12 millimeter.

18. The method of claim 16, wherein said calibrating step entails an increase of the diameter of the internal surface of the sleeve by between 5 and 40% of a difference between said maximum outer diameter of the male calibrating tool and the diameter of the internal surface of the sleeve prior to the calibrating step.

19. The method of claim 18, wherein said increase of the diameter of the internal surface of the sleeve is between 10 and 25%.

20. The method of claim 1, wherein the other surface is the internal surface of the sleeve and said calibrating step includes inserting into the sleeve a male calibrating tool in the direction of the common axis, and thereupon extracting the male calibrating tool from the sleeve in the direction of the common axis.

21. The method of claim 1, wherein the other surface is the external surface of the sleeve and said calibrating step includes slipping onto the external surface of the sleeve a female calibrating tool in the direction of the common axis, and thereupon retracting the female calibrating tool off the external surface of the sleeve in the direction of the common axis.

22. The method of claim 1, wherein at least a part of said calibrating step takes place simultaneously with said step of establishing said at least substantially clearance-free fit.

23. The method of claim 22, wherein said step of establishing said at least substantially clearance-free fit includes utilizing a first part of a combined fitting and calibrating tool, and said calibrating step includes utilizing a second part of the combined fitting and calibrating tool.

24. The method of claim 23, wherein the one surface is the external surface of the sleeve and the step of utilizing the second part of the combined fitting and calibrating tool includes causing the second part to enter the sleeve axially in a first direction prior to the step of establishing said at least substantially clearance-free fit so that a calibrating portion of the second part of the combined fitting and calibrating tool is confined in a portion of the internal surface of the sleeve which is to be calibrated, and extracting the second part of the combined fitting and calibrating tool from the sleeve in a second direction counter to the first direction and subsequent to the step of establishing said at least substantially clearance-free fit.

25. The method of claim 1 of making an apparatus of the type wherein the sleeve has a substantially axially parallel slot bounded by substantially axially parallel faces, wherein said step of establishing said at least substantially clearance-free fit comprises inserting the external surface of the sleeve into the complementary internal surface of the respective one of the input and output members to thus urge the substantially axially parallel faces bounding the slot against each other and to simultaneously urge the external surface of the sleeve against the complementary internal surface of the respective one of the input and output members.

26. The method of claim 1 of making an apparatus wherein the sleeve has two spaced apart ends and an external collar at one of the ends, and further comprising the step of locating the collar between confronting radial surfaces of the input and output members to thus determine the axial positions of the input and output members relative to each other.

27. The method of claim 26, further comprising the steps of making the collar of one piece with the one end of the sleeve, and imparting to the collar an at least substantially circular outline.

28. The method of claim 1, further comprising the step of imparting to the sleeve the shape of a cylinder.

29. The method of claim 1, further comprising the step of coating at least one of the internal and external surfaces of the sleeve with a friction reducing material.

30. The method of claim 1, wherein said step of establishing said at least substantially clearance-free fit comprises providing one of the input and output members with an axial extension close to the common axis of the input and output members, and inserting one of the extension and the sleeve into the other of the extension and the sleeve.

31. The method of claim 30, wherein said inserting step comprises establishing a press fit between the extension and the sleeve.

32. The method of claim 30, wherein said inserting step comprises establishing between the extension and the sleeve a sliding fit which permits the extension and the sleeve to turn relative to each other about the common axis of the input and output members.

33. The method of claim 30, wherein said providing step includes deforming a portion of the respective one of the input and output members to thus provide the extension on the deformed member.

34. The method of claim 33, wherein said deforming step is a deep drawing step.

35. The method of claim 1, further comprising the step of providing one of said input and output members with a socket and providing the other of said input and output members with an extension, said step of establishing said at least substantially clearance-free fit including a first inserting step of introducing one of the sleeve and the extension into the other of the sleeve and the extension, and further comprising a second inserting step of introducing the other of the sleeve and the extension into the socket upon completion of the calibrating step.

36. The method of claim 35, wherein the first inserting step includes establishing a tight fit between the extension and the sleeve.

37. The method of claim 35, wherein the second inserting step includes establishing a tight fit between a surface surrounding the socket and the other of said sleeve and said extension.

38. The method of claim 1 of making an apparatus wherein the input and output members respectively comprise primary and secondary flywheels, further comprising the steps of connecting the primary flywheel to a rotary output component of a prime mover in a power train of a motor vehicle, connecting the secondary flywheel with a rotary input component of a transmission in the power train, and providing the power train with a damper which opposes rotation of the flywheels relative to each other.

39. The method of claim 38, further comprising the step of utilizing the sleeve as a part of a combined radial and thrust bearing for the flywheels.

40. The method of claim 38, wherein the step of connecting the secondary flywheel with the rotary input component of the transmission includes providing the power train with an engageable and disengageable clutch arranged to receive torque from the secondary flywheel and to rotate the input component in the at least partially engaged condition thereof.

* * * * *

UNITED STATES PATENT AND TRADEMARK OFFICE
CERTIFICATE OF CORRECTION

PATENT NO.    : 6,418,620 B1
DATED         : July 16, 2002
INVENTOR(S)   : Jackel et al.

It is certified that error appears in the above-identified patent and that said Letters Patent is hereby corrected as shown below:

<u>Title page,</u>
Item [54], Title should read -- METHOD OF MAKING TORSIONAL VIBRATION DAMPERS WITH CENTERING UNITS BETWEEN THEIR INPUT AND OUTPUT MEMBERS --.

Signed and Sealed this

Twenty-fourth Day of December, 2002

JAMES E. ROGAN
*Director of the United States Patent and Trademark Office*